July 15, 1958 A. W. CARLSON 2,843,761

HIGH SPEED TRANSISTOR FLIP-FLOPS

Filed July 29, 1954 3 Sheets-Sheet 1

INVENTOR.
ARTHUR W. CARLSON

BY Wade Koontz AND

ATTORNEYS

July 15, 1958 A. W. CARLSON 2,843,761

HIGH SPEED TRANSISTOR FLIP-FLOPS

Filed July 29, 1954 3 Sheets-Sheet 2

INVENTOR.
ARTHUR W. CARLSON

BY Wade Koontz AND

ATTORNEYS

July 15, 1958 A. W. CARLSON 2,843,761

HIGH SPEED TRANSISTOR FLIP-FLOPS

Filed July 29, 1954 3 Sheets-Sheet 3

INVENTOR.
ARTHUR W. CARLSON

BY Wade Koontz AND

ATTORNEYS.

United States Patent Office 2,843,761

Patented July 15, 1958

2,843,761

HIGH SPEED TRANSISTOR FLIP-FLOPS

Arthur W. Carlson, Arlington, Mass., assignor to the United States of America as represented by the Secretary of the Air Force Application July 29, 1954, Serial No. 446,687

4 Claims. (Cl. 307—88.5)

(Granted under Title 35, U. S. Code (1952), sec. 266)

The invention described herein may be manufactured and used by or for the Goverment for governmental purposes without payment to me of any royalty thereon.

This application relates to high speed transistor flip-flops and particularly to transistor flip-flops operable with two stable non-saturated states.

In the operation of transistor flip-flops considerable difficulty has been encountered in securing high-speed turn off, or a high repetition rate. The principal difficulty in securing high operation of transistor flip-flops is because of the limitation caused by carrier storage, "hole storage," effects appearing when the transistor becomes sautrated. Once a transistor becomes saturated, the collector remains in a high conducting condition until the emitter electrode circuit has been open for a period of from a few 10ths of a microsecond for some point contact resistors to upwards of 10 or more microseconds for others. As a result of these carrier storage, "hole storage," effects the emitter must be held open for a period of time greater than the "hole storage" time in order that the transistor may be turned off when used in a bistable circuit when the transistor is allowed to saturate. When triggering a saturated transistor at the base electrode, the pulse width may not have to be as wide as when at the emitter electrode but a considerable amount of power is required to clear out stored holes. When triggering at the emitter electrode, a pulse width greater than the hole storage time is required.

The "hole storage" time (the time required to clear out holes) has been found to increase with increased saturation and with time spent in saturation. For a given degree of saturation, the "hole storage" time increases with time in saturation for saturation time up to about 20 microseconds after which it remains constant. These effects have seriously limited the repetition rates of flip-flops so that they are usable only at low repetition rates.

The "hole storage" problem may be overcome if the transistor is not permitted to go to saturation.

According to the present invention, a point contact transistor flip-flop is disclosed in which the transistors are never saturated. In the first embodiment according to the invention, this is accomplished by providing a pair of transistors and supplying a substantially constant current, common to the emitter electrodes of both transistors and utilizing one of the transistors as a load device or load circuit for the other transistor and applying triggering potentials to the transistors causing alternate on and off operation of the transistors. In the second arrangement, a single transistor is utilized and biasing potentials are utilized to modify the voltage current characteristic at the emitter to provide a broad flat peak between the positive and negative portions of the curve and to provide a flat bottom between the negative and saturation portions of the curve.

It is accordingly an object of the invention to provide a high speed transistor flip-flop.

It is a further object of the invention to provide a non-saturating transistor flip-flop.

It is a further object of the invention to provide a transistor flip-flop which eliminates the hole storage effect.

Other objects and many of the added advantages of the present invention will be apparent from the following specification taken in conjunction with the accompanying drawings in which.

Figure 1:
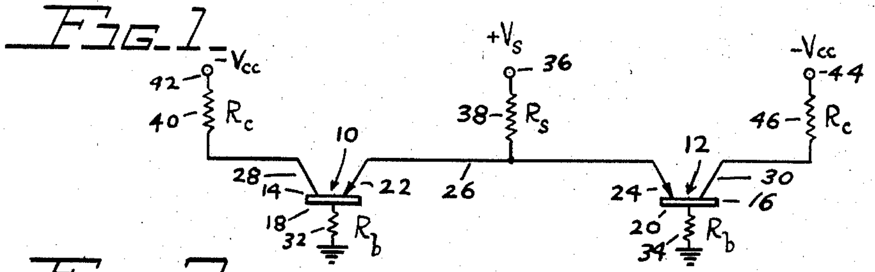
Figure 1 is a schematic illustration of the basic circuit of a two transistor non-saturating high speed flip-flop.

In the operative embodiment of the invention as disclosed in Figures 1 through 5 the high speed flip-flop is constituted by a pair of transistor elements 10 and 12, each of the elements 10 and 12 including a semi-conducting body 14 and 16 preferably constructed of semi-conducting material such as germanium, silicon or the like and any suitable additions or impurities as may be found desirable. A base electrode 18 is applied to the body 14 and a base electrode 20 is applied to the body 16, the base electrodes 18 and 20 being connected to the bodies 14 and 16 by ohmic connections, preferably soldered. An emitter electrode 22 of the "cat whisker" or point type is in point contact with the body 14 and a similar emitter electrode 24 is in point contact with the body 16. A common conductor 26 connects the emitter electrodes 22 and 24 in back to back relation.

A collector electrode 28 also preferably of the cat whisker type is in point contact with the body 14 and a similar collector electrode 30 is in point contact with the body 16. A base resistance 32 is connected between the base contact 18 and the lead connector of any connected circuit. A similar base connection 34 is applied to the base contact 20 of the transistor 12.

An operating current is applied from a suitable positive potential 36 over a suitable resistor 38 with the value of the voltage at 36 and the impedance at 38 being sufficient to provide a substantially constant current source, the constant current source represented by the voltage 36 and the impedance 38 is connected to the common connector 26 which connects the emitter electrode 22 and 24 in back to back relation.

Figure 2A:
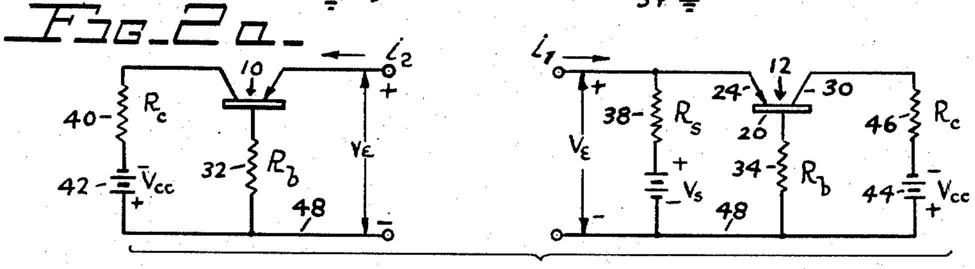
Figure 2A is an equivalent circuit of a two-transistor flip-flop divided into two parts for purposes of discussion.
Figure 2B:
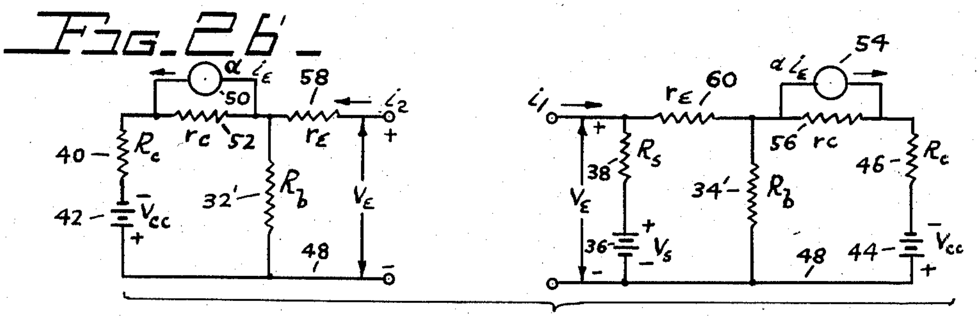
Figure 2B is an equivalent circuit replacing the transistors with an alpha generator, a shunt non-linear impedance and a non-linear emitter resistance with the ohmic resistance of the transistor lumped with the base resistance.

A load resistor 40 is connected to the collector electrode 28 and a collector voltage source terminal 42 is connected to the electrode 28 through the resistor 40. A similar collector voltage source terminal 44 is connected to the collector electrode 30 through the collector resistance 46. For simplicity and understanding the construction and operation of the high speed flip-flop, the connection is broken into sections as shown in Figure 2*a* and equivalent circuit connections established. It is understood that all of the voltages of $V_{cc}$ and $V_s$ have their opposite terminals to a common return as demonstrated in Figure 2*a* by the ground connection 48. For better understanding of the invention the transistors 10 and 12 are replaced by equivalent circuits utilizing an alpha generator 50 for the transistor 10 together with a non-linear shunt impedance 52 and having the ohmic resistance of the transistor 10 embodied in the base resistor 32 primed. Likewise, the transistor 12 is represented by alpha generator 54 and a non-linear shunt impedance 56 with base load resistance 34 primed including the ohmic resistance of the transistor 12. The internal non-linear emitter impedance of the transistor 10 being indicated by the impedance 58 and the internal non-linear emitter impedance of the transistor 12 being indicated by the impedance 60.

To analyze the circuit of Figure 1, consider it to be separated as shown in Figure 2A along with the equivalent circuits for the separated sections 2B. The internal base resistance is combined with $R_b$.

The circuit containing transistor 10 will be considered as a load to be connected to the circuit containing transistor 12.

$V_s$ supply, $V_{cc}$ collector voltage, V emitter voltage,$_\varepsilon$ $R_s$ supply resistance, $I_s$ supply current$=V_s/R_s$, $R_b$ base resistance, $R_c$ collector resistance, $i_1$ transistor current, $r_\varepsilon$ back resistance of emitter, $r_b$ internal base resistance, $r_c$ back resistance of collector.

First, the piecewise linear equivalent circuit of transistor 12 will be used to obtain the linearized $V_\varepsilon - i_1$ characteristic.

Cutoff region: $\delta=0$, $r_\varepsilon=r_\varepsilon'>>R_b$, $r_c$.

(1)
$$V_\varepsilon=\left(i_1+\frac{V_s}{R_s}\right)\left[\frac{R_s r_\varepsilon'}{R_s+r_\varepsilon'}\right]-\frac{R_bR_sV_{cc}}{(R_s+r_\varepsilon')(R_b+R_c+r_c)}$$

Active region:

(2)
$$V_\varepsilon=\left(i_1+\frac{V_s}{R_s}\right)\left[\frac{R_s\,[(r_\varepsilon+R_b)\,(R_b+R_c+r_c)-R_b(R_b+\delta r_c)]}{(R_s+r_\varepsilon+R_b)(R_b+R_c+r_c)-R_b(R_b+\delta r_c)}\right]-\frac{R_bR_sV_{cc}}{(R_s+r_\varepsilon+r_b)\,(R_b+R_c+r_c)-R_b(R_b+\delta r_c)}$$

Saturated region: $r_c\rightarrow 0$.

(3)
$$V_\varepsilon=\left(i_1+\frac{V_s}{R_s}\right)\left[\frac{R_sr_\varepsilon[(R_b+R_c)+R_bR_C]}{(R_s+r_\varepsilon)(R_b+R_c)+R_bR_c}\right]-\frac{R_bR_sV_{cc}}{(R_s+r_\varepsilon)\,(R_b+R_c)+R_bR_c}$$

To consider the effect of battery $V_s$ and resistance $R_s$, let $V_s$ and $R_s$ approach infinity in such a way that $$\frac{V_s}{R_s}=I_s$$

i. e., the combination $V_s$ and $R_s$ is replaced by a current source $I_s$. When this is done, Equations 1, 2, and 3 become:

(1*a*)
$$V_\varepsilon=(i_1+I_s)r_{\varepsilon'}-\frac{R_bV_{cc}}{R_b+R_c+r_c}$$

(2*a*)
$$V_\varepsilon=(i_1+I_s)\left[\frac{(r_\varepsilon+R_b)(R_b+R_c+r_c)-R_b(R_b+\delta r_c)}{R_b+R_c+r_c}\right]-\frac{R_bV_{cc}}{R_b+R_b+r_c}$$

(3*a*)
$$V_\varepsilon=(i_1+I_s)\left[\frac{r_\varepsilon(R_b+R_c)+R_bR_c}{R_b+R_c}\right]-\frac{R_bV_{cc}}{R_b+R_c}$$

These equations give the conventional "*n*" curve shifted to the left by the amount $I_s$. Thus it may be expected that if $R_s$ and $V_s$ are sufficiently large so that they may approximate a current source the principal effect will be to shift the "*n*" to the left parallel to the $i_1$ axis.

Now the circuit of transistor 10 will be considered to be the load line for the circuit of transistor 12. This is accomplished by connecting the separated sections in Figures 2*a* and 2*b*. The load line may be plotted by obtaining the emitter characteristic of transistor 10 and replacing the current $i_2$ with $-i_1$ since, when the sections are joined, $i_2=i_1$. Using the same piecewise linear approximations as before, the following equations are obtained for the load line in the $V-i_1$ plane:

Saturated region:

(4)
$$V_\varepsilon=-i_1r_{\varepsilon'}-\frac{R_bV_{cc}}{R_b+R_c+r_c}$$

Active region:

(5)
$$V_\varepsilon=-i_1\left[\frac{(r_\varepsilon+R_b)\,(R_b+R_c+r_c)-R_b(R_b+\delta r_c)}{R_b+R_c+r_c}\right]-\frac{R_bV_{cc}}{R_b+R_c+r_c}$$

Cutoff region:

(6)
$$V_\varepsilon=-i_1\left[r_\varepsilon+\frac{R_bR_c}{R_b+R_c}\right]-\frac{R_bV_{cc}}{R_bR_c}$$

From a comparison of the above equations, it will be noted that the voltage-current characteristics of each of the transistors 10 and 12 includes a first positive resistance portion 66 and an intermediate negative resistance portion 68 merging into a saturated positive resistance portion 70.

Figure 3:
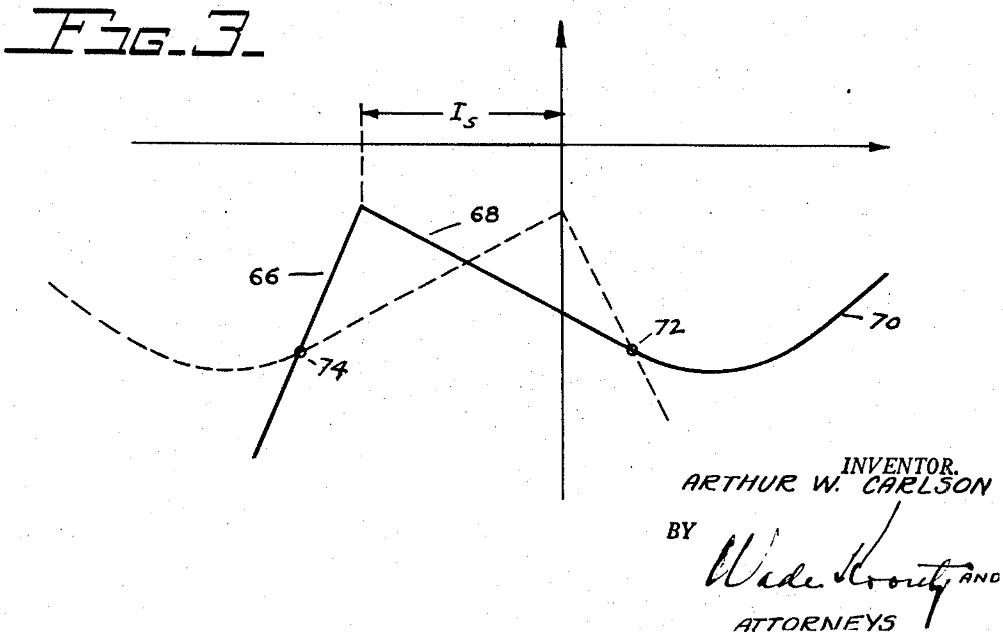
Figure 3 is a diagrammatic illustration of the voltage characteristics of a pair of non-saturating transistors showing the stable operating positions thereof.

From Figure 3 it is seen that there are two stable points of operation where one transistor is "on" and the other "off" with neither transistor saturated, thus making it possible to turn the transistors off without "hole storage" problems. With no "hole storage" to restrict the repetition rate of the flip-flop, high speed operation is possible to the limit determined primarily by the frequency response of the transistors. The rise time of the collector wave-form should be essentially that measured in rise time tests where a contant current step is applied at the emitter. The operation of the flip-flop may be considered as switching what is essentially a constant current source from the emitter of one transistor to the other.

Figure 4:
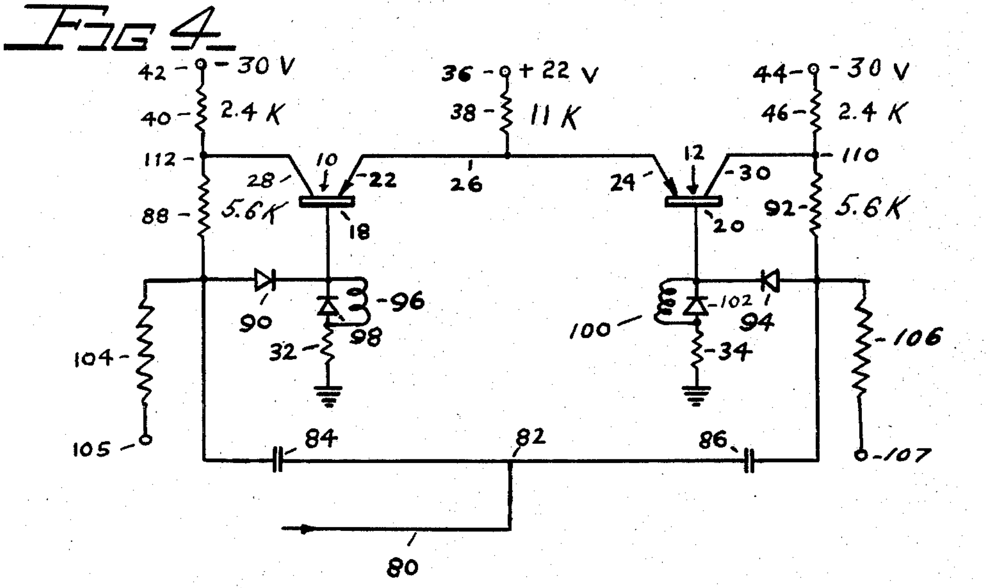
Figure 4 is a schematic diagram showing the utilization of positive trigger pulses for controlling the non-saturating flip-flop.
Figure 5:
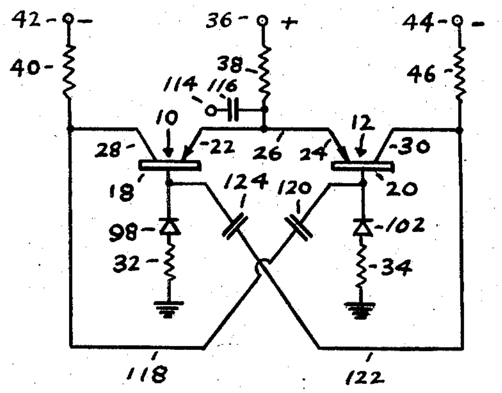
Figure 5 is a similar diagram showing the utilization of negative tripping pulses for controlling the reversal of operating characteristics of the transistors of the flip-flop.

To provide a useful application of the high speed flip-flop device as indicated in Figure 1, a tripping circuit of the positive potential type is applied as shown in Figure 4 or of the negative type as shown in Figure 5.

In constructions according to Figure 4 impulses from a source of positive tripping potential are supplied over the connection 80 to an intermediate point 82 between a pair of tripping capacitors 84 and 86. The capacitor 84 being connected to the collector electrode 28 by means of an impedance 88 and to the base terminal 18 by means of a rectifier element 90. Likewise, the capacitor 86 is connected to the collector electrode 30 by means of the high impedance 92 and to the base electrode 20 by means of the rectifier element 94.

In order to stabilize the operation of the system with minimum tripping impulses an impedance 96 of the reactor type and in the present instance having an inductance of substantially 100 microhenries is connected in shunt with a rectifier 98 which is connected to the base electrode 18. The rectifier 98 being poled in opposition to the direction of major current flow in the emitter electrode 22. Likewise, a reactor 100 is connected in shunt with a rectifier 102 connected in series circuit relation with the base electrode 20 and the base resistor 34. In order to permit operation with smaller tripping impulses applied to the capacitor 84 and 86, a biasing impedance 104 is provided from the junction of the impedance 88 and the rectifier 90 and may have a biasing potential source terminal 105 connected thereto, the whole being in shunt with the capacitor 84 and the impulsing source (not shown). Likewise a resistor 106 having the biasing terminal 107 is connected in shunt with the capacitor 86 and the impedance source.

In the operation of this form of the invention positive impulses of relatively short duration are applied from any suitable source over the connector 80 to the connector 82 and the capacitor 86. An operating current for the emitter electrodes 22 and 24 will be provided by means of the voltage source terminal 36 in the present instance when using transistors similar to commercial type 1698, 22 volts is applied over the impedance 38 which is substantially 11K. Similarly, the collector terminals 42 and 44 are provided with collector negative voltage sources substantially of the order of 30 volts and the impedances 40 and 46 are of the order of 2.4K. A biasing potential of the order of 22 volts is applied to the terminal of the biasing resistors 104 and 106.

Assuming that one of the transistors, such as 12, has become operative under the applied operating currents the emitter 22 becomes biased in the reverse direction making transistor 10 inoperative, or off. Because of the flow of collector current in collector electrode 30 the point 110 becomes considerably less negative while the point 112 remains only slightly less negative than the collector source terminal 42. Consequently, at the next positive impulse the rectifier 94 will become conducting applying back potential to the emitter electrode 24 and causing the emitter electrode 22 to turn on while the emitter electrode 24 is turned off. Because of the absence of "carrier storage," "hole storage," effects the transition from "on" to "off" will be extremely rapid, limited principally by the frequency response of the transistors, so that the device will flip-flop from "on" to "off" at extreme repetition rates.

In the modification according to Figure 5 the basic flip-flop of Figure 1 is provided with a negative impulse control circuit having a source of negative control impulses (not shown) connected to an input terminal 114 and connected to the common connection 26 by means of a capacitor 116. The collector electrode 28 is connected to the base electrode 20 of the transistor 12 by means of a circuit 118 including a capacitor 120. Likewise the collector electrode 30 of the transistor 12 is connected to the base electrode 18 of the transistor 10 by means of a circuit 122 containing the capacitor 124.

Assuming that the proper voltage and resistance has been applied to create the constant operating current applied to the common connector 26 and that one of the emitter electrodes such as 24 is carrying current, an impulse of negative potential will be applied over the capacitor 116 to the emitter electrode 24 carrying current so that the flow of current will be disestablished therein and charge of the capacitors 120 and 124 will cause current to flow to the back to back emitter electrode 22. Likewise with each succeeding negative impulse the "on" emitter electrode will be blocked and the other electrode will be turned on.

Figures 6, 7, 8:
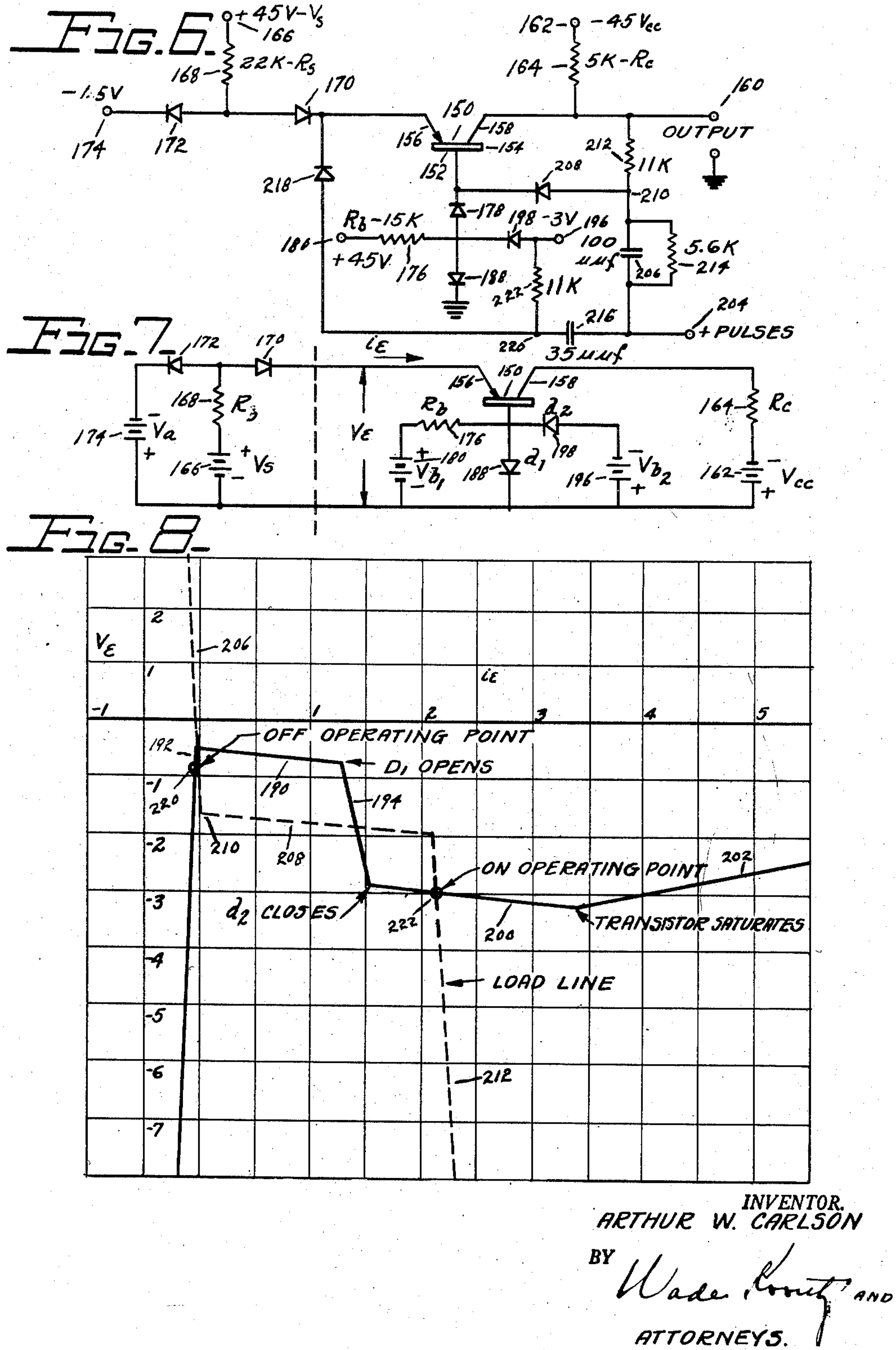
Figure 6 is a modification replacing one of the transistors with a selective switching rectifier and with bias control for modifying the voltage current characteristic of the transistor.
Figure 7 is an equivalent circuit for the modified flip-flop.
Figure 8 is a diagrammatic illustration of the load line and voltage current characteristic of the modified flip-flop.

The non-saturating single transistor flip-flop illustrated in Figures 6 through 8, inclusive, may be derived from the two transistors flip-flop previously described by considering the emitter of one of the transistors to be a rectifying device.

A transistor 150 is provided with a body 152 of semiconducting material as previously described. The transistor 150 is provided with a base electrode 152 which is in ohmic contact with the body 154 by any suitable connection. An emitter electrode 156 is in point contact with the body 154 and collector electrode 158 is in similar point contact. A collector output terminal 160 is connected to the collector electrode 158, and a collector voltage source terminal 162 is connected to the output terminal 160 by means of a resistor device 164. An actuating voltage terminal 166 is connected through a resistor element 168 to the voltage of the source represented by the terminal 166 and the impedance of the resistor 168 bein sufficient to provide a substantially constant actuating current source. The actuating current source represented by the terminal 166 and the resistor 168 is connected to the emitter electrode 156 by means of rectifying device 170. A rectifying device 172 is connected in back to back relation with the rectifying device 170 and is connected to a suitable bias potential terminal 174 supplies a negative potential in the rectifier discharge circuit. A base resistor 176 is connected to the base electrode 152 and preferably a rectifying device 178 is connected in series circuit relation to the base electrode 152 and the base resistor 176 with the base circuit being operative in connection with semi-conducting body 154 to provide a negative resistance characteristic at the emitter electrode 156.

A first biasing potential is applied to the terminal 180 and operative to raise the peak point of the characteristic curve of the transistor to substantially the origin voltage-current plane. A first control rectifying device 188 is connected intermediate the biasing potential source terminal 180 and the base electrode 152 and being operative to modify the "N" curve characteristic of the transistor 150 to provide a substantially broad flat peak portion 190 between the initial positive resistance portion 192 of the characteristic curve and the intermediate negative resistance portion 194 of this characteristic curve.

A second biasing source terminal 196 is connected to the base electrode by means of a second control rectifying device 198 and being operative to provide a substantially flat bottom portion 200 in the transistor characteristic curve between the intermediate negative resistance characteristic portion 194 and the saturated transistor characteristic portion 202.

A source of positive impulses is connected at the impulse terminal 204 which is connected to the base electrode 152 by means of a capacitor 206 connected in series circuit relation with a control rectifying device 208. The junction 210 between the capacitor 206 and the rectifying device 208 being connected to the output terminal 160 by means of impedance device being shown as a resistor 212. Preferably a discharge circuit 214 is placed in shunt relation around the capacitor 206 to remove the charge therefrom in a pre-determined time limit. Likewise, the terminal 204 is connected to the emitter electrode 156 by means of the series circuit containing the capacitor 216 and the rectifying device 218. Preferably, the junction point 220 between the capacitor 216 and the rectifying device 218 is connected to the biasing voltage terminal 196 by an impedance device illustrated as a resistor 222.

The circuit characteristics of the modification according to Figure 6 may be best understood by the equivalent circuits of Figure 7 in which the input characteristics for the transistor may be best approximated by the following equations:

$d_1$ closed and $d_2$ open (where $r_e'$ is the back resistance of the emitter)

$$V_e = i_e r_e' - \frac{V_{cc} r_b}{r_b + r_c + R_c} \qquad (7)$$

$$V_\epsilon=i_\epsilon\left[\frac{(r_\epsilon+r_b)(r_b+r_c+R_c)-r_b(r_b+\alpha r_c)}{r_b+r_c+R_c}\right]-\frac{V_{cc}r_b}{r_b+r_c+R_c} \quad (8)$$

$d_1$ open and $d_2$ open $$V_\epsilon=i_\epsilon\left[\frac{(r_\epsilon+r_b+R_b)(R_b+r_b+r_c+R_c)-(R_b+r_b)(R_b+r_b+\alpha r_c)}{R_b+r_b+r_c+R_c}\right]-\frac{(V_{cc}+V_{b_1})(R_b+r_b)}{R_b+r_b+r_c+R_c}+V_{b_1} \quad (9)$$

$d_1$ open and $d_2$ closed $$V_\epsilon=i_\epsilon\left[\frac{(r_\epsilon+r_b)(r_b+r_c+R_c)-r_b(r_b+\alpha r_c)}{r_b+r_c+R_c}\right]-\frac{(V_{cc}-V_{b_2})r_b}{r_b+r_c+R_c}-V_{b_2} \quad (10)$$

$$V_\epsilon=i_\epsilon\left[r_\epsilon+\frac{r_bR_c}{R_cr_b}\right]-\frac{(V_{cc}-V_{b_2})r_b}{R_c+r_b}-V_{b_2} \quad (11)$$

In the operation of the modification according to Figures 6 to 8, it will be assumed that the constant actuating current has been established from the terminal 166 through the impedance of the resistor 168 and that the rectifier device 172 is conducting so that the constant current flows in a shunt circuit. In order to initiate the conducting period of the transistor 150, a positive impulse will be applied to the terminal 204 which will cause the emitter 156 to become operative to turn on transistor 150. The slope of the portion 206 of the load line represented by the conduction through the rectifying device 172 being substantially determined by the back resistance of the rectifier device 170 in the emitter electrode circuit. At the instance of transition the slope of the portion of the load line 208 is substantially determined by the forward resistance of the conducting rectifier devices 172 and 170 with the break point 210 being determined by the voltage applied to the terminal 174. The portion 208 terminates in the portion 212, the slope of which is determined substantially by the impedance of the resistor device 168 and the voltage intercept being determined by voltage V. S applied to terminal 166.

Successive applications of positive impulses to the terminal 204 causes successive reversal of the conductivity of the transistor 150 or "on" and "off" operation with successive impulses. Since it will be apparent from the position of the points 220 and 222 where the load line crosses the operating characteristic that the device operates on a non-saturating portion of the transistor characteristic curve, the device will have two stable operating points with substantially no "hole storage" effects.

It will thus be apparent that the present invention has provided a transistor flip-flop having two stable operating points and eliminating "hole storage" effects so that the transistor flip-flop may operate at a high speed determined largely by the frequency response of the transistor.

For purposes of exemplification, particular embodiments of the invention have been shown and described according to the best present understanding thereof. However, it will be apparent to those skilled in the art that various changes in modification in the construction and arrangement of the bodies thereof may be readily resorted to without departing from the true spirit and scope of the invention.

What is claimed is:

1. A high speed transistor flip-flop comprising a pair of transistor devices each including a body, a base electrode in ohmic contact with said body, an emitter electrode and a collector electrode in point contact with said body, a direct low impedance connection connecting said emitter electrodes in back to back relation, a source of substantially constant operating current connected to said common connection, an independent load impedance connected to each of said collector electrodes, an independent rectifier connected in series circuit relation to each of said base electrodes, said rectifiers being poled in opposition to the direction of major current flow in the respective emitter electrodes, a high impedance reactive shunt connected across said rectifier, and a triggering circuit connected to apply positive impulses to said base electrodes.

2. A transistor flip-flop with two stable, non-saturated states comprising a pair of transistors, each of said transistors including a semi-conducting body, a base electrode in ohmic contact with said body, a collector electrode and an emitter electrode in point contact with said body, said emitter electrodes being directly connected in back to back relation, a single source of substantially constant operating current connected to said emitter electrodes, a rectifier connected in series circuit relation to each of said base electrodes, said rectifiers being poled in opposition to the major current flow in the respective emitter electrodes, and an output resistor connected to each of said collector electrodes.

3. A transistor flip-flop with two stable, non-saturated states comprising a pair of transistors each of said transistors including a semi-conducting body, a base electrode in ohmic contact with said body, a collector electrode and an emitter electrode, a direct low impedance conductor connecting said emitter electrodes in back to back relation, means operative to supply a substantially constant operating current to said emitter electrodes, a rectifier connected in series circuit relation to each of said base electrodes, said rectifiers being poled in opposition to the major current flow in the respective emitter electrodes, an output resistor connected to each of said collector electrodes, and control means operative to sequentially reverse the conducting relation of said transistors whereby said transistors alternately operate as load circuits.

4. A high speed transistor flip-flop comprising a pair of transistor elements, each of said transistor elements including a semi-conducting body, a base member in ohmic contact with said body, an emitter and a collector electrode in point contact with said body, said emitter electrodes being electrically connected in back to back relation, circuit means operative to supply a substantially constant operating current to said emitter electrodes, circuit means connected to each of said base electrodes and being operative in cooperation with said body to produce a negative resistance characteristic at said emitter electrodes, said circuit means including in series circuit relation a resistor and a unidirectional conductor, said unidirectional conductor being poled in opposition to the direction of major current flow through said emitter electrode, and a reactor connected in shunt with said unidirectional conductor.

References Cited in the file of this patent

UNITED STATES PATENTS

| | | |
|---|---|---|
| 2,591,961 | Moore et al. | Apr. 8, 1952 |
| 2,605,306 | Eberhard | July 29, 1952 |
| 2,622,212 | Anderson et al. | Dec. 16, 1952 |
| 2,759,104 | Skellett | Aug. 14, 1956 |